United States Patent [19]

Olschewski et al.

[11] 4,213,656

[45] Jul. 22, 1980

[54] DRILLING BIT

[75] Inventors: Armin Olschewski; Wolfgang Huber, both of Schweinfurt, Fed. Rep. of Germany

[73] Assignee: SKF Kugellagerfabriken GmbH, Schweinfurt, Fed. Rep. of Germany

[21] Appl. No.: 944,968

[22] Filed: Sep. 22, 1978

[30] Foreign Application Priority Data

Sep. 29, 1977 [DE] Fed. Rep. of Germany ....... 2743825

[51] Int. Cl.² .............................................. F16C 33/80
[52] U.S. Cl. .................... 308/8.2; 308/36.1; 308/187.1
[58] Field of Search ...... 308/8.2, 36.4, 36.3, 308/187.1, 36.1, 36.2; 175/371; 277/56, 134, 3

[56] References Cited

U.S. PATENT DOCUMENTS

| 3,251,634 | 5/1966 | Dareing | 308/8.2 |
| 4,035,039 | 7/1977 | Johansson et al. | 308/8.2 |
| 4,153,258 | 5/1979 | Hüber et al. | 277/56 |

FOREIGN PATENT DOCUMENTS 2021011 11/1972 Fed. Rep. of Germany .

Primary Examiner—Lenard A. Footland
Attorney, Agent, or Firm—Eugene E. Renz, Jr.

[57] ABSTRACT

A rotary drilling bit having at least one cutter rotatably supported in a rolling bearing on a trunnion of the drilling bit body. An edge ring is provided with a seal fixed in the bored hole of the rotary cutter between the rollers of the rolling bearing and the drilling bit body which axially guides the rollers in one direction. The edge ring has a machined surface which faces the outside surface of the trunnion defining therebetween a narrow annular gap and the seal consists of at least one radially held seal ring arranged in the annular gap.

6 Claims, 4 Drawing Figures

DRILLING BIT

BACKGROUND OF THE INVENTION

The present invention relates to drilling apparatus for use in underground exploration of petroleum products. These drilling apparatus usually comprise a rotary drilling bit with a plurality of cutters rotatably supported in a rolling bearing on a trunnion of the drilling bit body. These assemblies usually also include an edge ring provided with a seal which is fixed in the bored hole of the rotary cutter between the rollers of the roller bearing and the drilling bit body. These rings with seals serve to guide the rollers axially to one side.

Rotary drilling bits of this general type are known in the prior art. For example, a German application No. 2,021,011 shows a drilling bit wherein a slip ring with a sealing ring is provided between the edge ring fixed in the rotary cutter and the trunnion of the drilling bit body which laterally faces a slip ring with a sealing ring installed towards the side of the drilling bit body attached in a holder bolted to the trunnion. This arrangement has several disadvantages and drawbacks. For example, it has been observed that a comparatively large amount of axial space is needed to house the sealing elements requiring that the trunnion must be constructed in cantilever fashion at a relatively large distance from the drilling bit body and consequently the rolling bearing occupies a large space in the drilling bit body. Therefore, the loading forces of the rotary cutters cause an unfavorably high bending moment at the trunnion. Additionally, the endurance and load capacity of the rotary cutter have been found to be inadequate since the relatively long trunnion of the drilling bit body has a tendency to be distorted and bend in operation as the result of high impact loads whereby the bearings of the rotary cutters operate in a skewed or tilted position and thereby fail prematurely. Consequently the useful life of the known rotary drill bits is quite abbreviated.

SUMMARY OF THE INVENTION

With the above in mind, it is an object of the present invention to provide an improved rotary drilling bit which is compactly constructed in an axial direction, the arrangement extending the life of the rotary cutters and providing trouble free sealing of the bearing space.

The above objective is achieved in accordance with the present invention by provision of an edge ring having a machined surface facing the outside surface of the trunnion with an intermediate narrow radial gap and a seal consisting of at least one radially elastically expanding piston ring arranged in the annular gap between the edge ring and the trunnion. By this construction, the axial height of the rotary cutter is only slightly increased by the edge ring with the seal. In this manner possible wear of the roller bearing in operation and the consequent increase of the radial bearing play in the roller bearing, the edge ring assumes a portion of the bearing load in which the machined surface of the edge ring slides on the outside surface of the trunnion. A trouble free seal of the bearing space to the flushing liquid surrounding the rotary cutter is simultaneously provided since even in wear-related changes of the sealing or slit gap between the machined surface of the edge ring and the outside surface of the trunnion, a proper sealing action of the seal ring or rings is provided since they hold radially and are properly held independent of the wear of the seating surfaces in the machined surface of the edge ring or against the outside surface of the trunnion.

In accordance with the specific feature or characteristic of the invention, the seal ring is arranged in an annular groove of the trunnion and lies under elastic tension against the machined surface of the edge ring. As a result, the seal ring presses elastically against the machined surface of the edge ring and is held in the edge ring by frictional contact. In operation, the seal ring rotates with the edge ring mounted or supported in the proper rotary cutter. By this construction, the seal ring can penetrate or dig into the annular groove of the trunnion and consequently permanently act as a labyrinth seal. In order to facilitate this operation or action of the seal ring, it is preferably made of a hard metal, for example, tungsten carbide.

In accordance with still another feature of the present invention, the side surfaces of the seal ring may be provided with spiral grooves oriented in a predetermined manner to pump outwardly so that penetration of the flushing liquid into the bearing space is counteracted by the outward pumping action of the spiral grooves. Specifically mud and wear particles, pressed forward from outside are entrained in the spiral grooves so that they cannot penetrate any further into the bearing space. This, of course, prevents wear and premature failure of the bearing from this source.

In accordance with a still further feature or characteristic of the present invention, the front surface of the edge ring confronting the drill bit body is provided with an annular recess in which a corresponding projection of the drilling bit body engages to form a labyrinth seal.

DESCRIPTION OF THE DRAWINGS

These and other objects of the invention of the various features and details of the operation and construction thereof are hereinafter more fully set forth with reference to the accompanying drawings, wherein.

DESCRIPTION OF PREFERRED EMBODIMENTS

Figure 1:
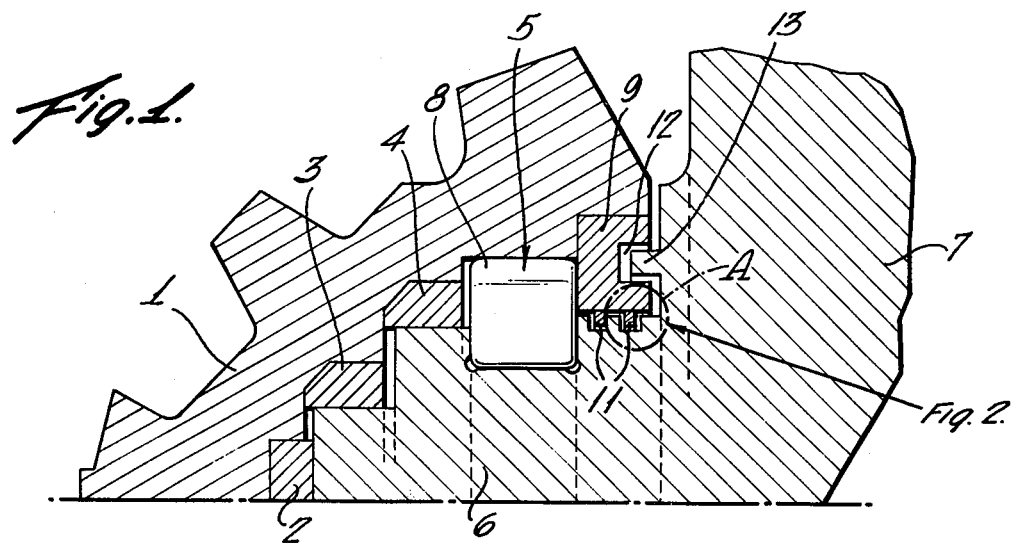
FIG. 1 is a fragmentary cross-sectional view through the rotary cutter of a rotary drill bit.

Referring now to the drawing and particularly to FIG. 1 thereof, there is illustrated a rotary cutter of a rotary drilling bit which is generally designated by numeral 1. The cutter 1 is rotatably supported on bearings including a series of friction bearing inserts 2, 3 and 4 and a roller bearing 5 mounted on the one-piece trunnion 6 of the drilling bit body 7. In accordance with this embodiment of the invention, the cylindrical rollers 8 of the roller bearing 5 are arranged at the drilling bit body side of the rotary cutter 1. As illustrated in FIG. 1, the rollers 8 are axially guided on the axial end faces thereof facing the drill bit body 7 by an annular member which seats in an undercut or pocket in the rotary cutter end face by what is termed an edge ring 9. The edge ring 9 is mounted in a fixed position in a bored undercut or hole in the rotary cutter and may be secured thereto for example by welding. The edge ring 9 has a machined surface 10 defined by the inner peripheral face thereof which as illustrated is located opposite and confronts the outside surface 17 of the trunnion 6 and is spaced therefrom to define a narrow annular gap or space. Sealing rings 11, in the present instance comprising a pair, are located in spaced side-by-side relation in the machined surface 10 of the edge ring. The sealing rings are disposed in the annular gap between the edge ring 9 and trunnion 6 and radially rest on the outside under elastic tension against the machined surface 10 and form therefore a friction contact with the machined surface 10.

The front axial end face of the edge ring 9 facing the drill bit body 7 is provided with an annular or circumferentially extending recess 12 to receive a lateral annular projection 13 of the drill bit body and form therewith a labyrinth seal.

Figure 2:
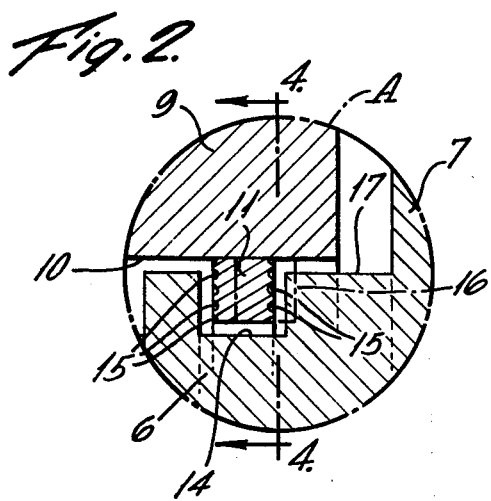
FIG. 2 is an enlarged sectional view of the portion of the roller bit encircled and designated with the letter A in FIG. 1.
Figure 4:
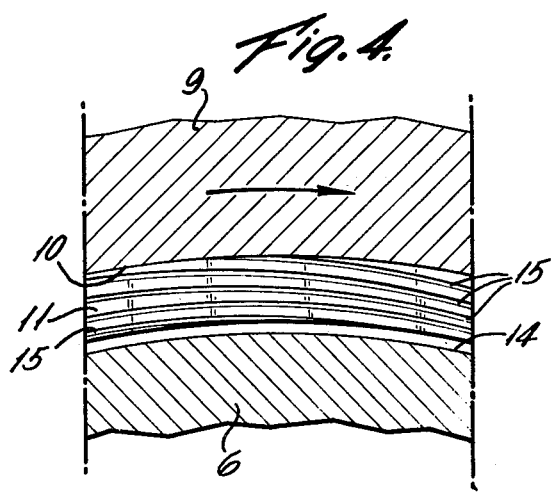
FIG. 4 is transverse fragmentary sectional view taken on line 4—4 of FIG. 2.

As can thus be seen in FIG. 2, each seal ring 11 is laterally guided in an annular groove or pocket 14 of the trunnion 6. Preferably the side surfaces of the seal rings 11 are provided with shallow spiral grooves 15 which may be formed therein for example by etching and which are arranged and oriented in a predetermined pattern relative to the direction or rotation of the rotary cutters 1 to pump by means of hydrodynamic action in a radially outward direction and consequently prevent the surrounding flushing liquid pressing towards the sealing rings from penetrating the bearing space.

The sealing rings 11 are preferably made of a material harder than the trunnion, for example, tungsten carbide so that upon contact with the side surfaces of the annular groove 12 of the trunnion, during a friction contact with these surfaces they penetrate and form a step (shown in broken lines in FIG. 2) thereby to increase the sealing effect.

It has been observed that the friction bearing inserts 2, 3 and 4 may possibly produce in the operation of the cutting roller, wear particles which can penetrate the roller bearing 5 and thereby cause wear with the result that radial bearing play gradually increases. When this happens, the edge ring may assume a portion of the radial load of the bearing 5 since the machined surface 10 of the edge ring closely confronts the outside surface of the trunnion 6 and this machined surface 10 begins to contact and slip on the surface 17 of the trunnion. The carrying support length of the rotary cutter 1 is simultaneously increased so that the rotary cutter 1 even after some wear of the roller bearings 5 is prevented from assuming an unacceptable large tilted or skewed attitude.

Figure 3:
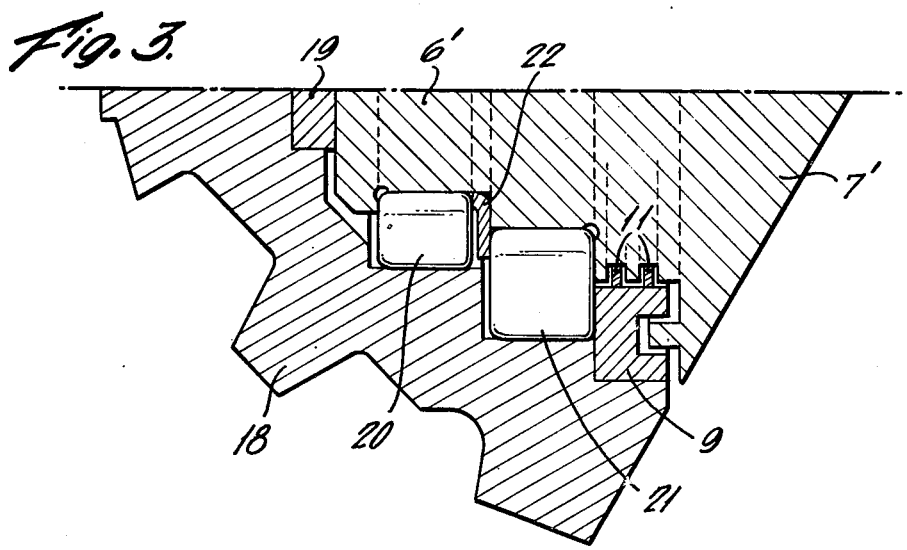
FIG. 3 is a fragmentary sectional view through the cutting roller showing a modification of the embodiment illustrated in FIG. 1.

There is illustrated in FIG. 3 a modified form of rotary drill bit according to the present invention. The basic details and arrangement are generally similar to that described above. In the present instance, however, the bearing arrangements supporting the rotary cutter on the trunnion is somewhat different. In the present instance, the cutter 18 is rotatably supported on the trunnion 6 via the friction bearing insert 19 between the tip of the cutter 18 and the outer axial end face of the trunnion, and two rows of rolling bearings. The rollers 20 of the inside roller bearing are supported on the laterally adjacent rollers 21 of the row of outside roller bearings located at the drilling bit body side of the rotary cutter 18 on the one-piece trunnion 6 of the drill bit body 7. The edge ring 9 and the seal rings 11 are constructed and arranged in the assembly in the same manner as in the assembly described above in connection with FIGS. 1 and 2. However, note that between the rollers 20 and the rollers 21, an annular thrust plate 22 has been loosely inserted. The thrust plate is preferably made of a suitable friction bearing material, for example, bronze and is capable by itself to absorb substantial axial guide forces of the rollers 20 or 21 without damage.

In view of the above, it is submitted that the rotary drill bit according to the present invention has the distinct advantage that it is compactly constructed in an axial direction. Additionally, the rotary cutters of the drill bit have a substantial endurance and a long useful life with a permanent trouble-free seal.

While specific embodiments of the present invention have been described herein, it is intended that the invention is not limited by the specific structure illustrated and that changes and modifications may be made therein within the scope of the invention concept. For example, even though cylindrical rollers are shown, rolling bearings with rollers of different shapes may also be used advantageously. For example, spherical rollers may be employed. Additionally, while the seal rings made of a harder material than the trunnion provide additional features and advantages they do not have to be made of a hard metal. They may, for example, consist of another suitable material such as cast bronze.

The drilling bit is assembled by placing the seal rings 11 into the annular grooves 14 and moving the edge ring 9 axially on the trunnion 6. The edge ring 9 is thereby pressed over the seal rings 11, compressing these rings radially inwardly into the annular grooves 14. The bearing rollers 8, 20 and 21 are then placed on the trunnion 6 and thereafter the cutting roller is positioned over the rollers 8, 20 and 21 against the edge ring 9. The edge ring 9 may then be secured in the bore of the cutting roller for example by welding.

What is claimed is:

1. A rotary drilling bit having at least one cutter rotatably supported in a rolling bearing on a trunnion of a drilling bit body, an edge ring provided with a seal fixed in the bored hole of the rotary cutter between rollers of the rolling bearing and the drilling bit body and axially retains the rollers in one direction, characterized in that the edge ring has a machined surface which faces the outside surface of the trunnion defining therebetween a narrow annular gap and in that the seal consists of at least one radially held seal ring arranged in said annular gap; and wherein the side surfaces of the seal ring are provided with spiral grooves which pump outwardly; and wherein the front surface of the edge ring which faces the drilling bit body has an annular recess defined by two longitudinally extending flanges into which a corresponding axial projection of the drilling bit body engages to form a labyrinth seal.

2. Rotary drilling bit according to claim 1, characterized in that the seal ring is arranged in an annular groove of the trunnion and lies under elastic tension against the machined surface of the edge ring.

3. Rotary drilling bit according to claim 1, characterized in that the seal ring is made of a hard metal: for example, tungsten carbide.

4. A rotary drilling bit according to claim 1 wherein the bearing support for the rotary cutter comprises two rows of rollers and including an annular thrust plate inserted between the rows of rollers.

5. A rotary drilling bit as claimed in claim 4 wherein said thrust plate is made of a friction bearing material, for example, bronze.

6. Rotary drilling bit according to claim 1, characterized in that the seal ring is made of tungsten carbide.

* * * * *